US012731032B2

(12) United States Patent
Aragon et al.

(10) Patent No.: US 12,731,032 B2
(45) **Date of Patent: *Sep. 8, 2026**

(54) ADAPTABLE ON-DEPLOYMENT LEARNING PLATFORM FOR DRIVER ANALYSIS OUTPUT GENERATION

(71) Applicant: ALLSTATE INSURANCE COMPANY, Northbrook, IL (US)

(72) Inventors: Juan Carlos Aragon, Redwood City, CA (US); Regina Madigan, Mountain View, CA (US)

(73) Assignee: Allstate Insurance Company, Northbrook, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/010,764

(22) Filed: Jan. 6, 2025

(65) Prior Publication Data

US 2025/0139406 A1 May 1, 2025

Related U.S. Application Data

(63) Continuation of application No. 18/130,125, filed on Apr. 3, 2023, now Pat. No. 12,210,955, which is a continuation of application No. 16/580,353, filed on Sep. 24, 2019, now Pat. No. 11,620,494.

(60) Provisional application No. 62/736,783, filed on Sep. 26, 2018.

(51) Int. Cl.

*G06N 3/08* (2023.01)
*B60W 60/00* (2020.01)
*B62D 1/28* (2006.01)

(52) U.S. Cl.

CPC .............. *G06N 3/08* (2013.01); *B60W 60/00* (2020.02); *B60W 60/0059* (2020.02); *B62D 1/28* (2013.01)

(58) Field of Classification Search

CPC .... G06N 3/08; B60W 60/00; B60W 60/0059; B62D 1/28

See application file for complete search history.

(56) References Cited

U.S. PATENT DOCUMENTS 11,699,522 B2 * 7/2023 Ghose .................... G06N 5/022 706/45

* cited by examiner

*Primary Examiner* — Shirley X Zhang

(57) ABSTRACT

Aspects of the disclosure relate to enhanced processing systems for providing dynamic driving metric outputs using improved machine learning methods. A computing platform may receive sensor data from vehicle sensors. The computing platform may generate a pattern deviation output corresponding to an output of a sensor data analysis model, an actual outcome associated with a lowest TTC value, and driving actions that occurred over a prediction horizon corresponding to the pattern deviation output. The computing platform may cluster the pattern deviation outputs to maximize a ratio of inter-cluster variance to intra-cluster variance. The computing platform may train a long short term memory (LSTM) for each cluster, and may verify consistency of the pattern deviation outputs in the respective clusters. After verifying the consistency of the pattern deviation outputs in each cluster, the computing platform may modify the sensor data analysis model to reflect pattern deviation outputs associated with verified consistency.

20 Claims, 10 Drawing Sheets

505

Driver Analysis Interface

Customized Driving Score: 7/10

Recent Driving Improvement: +10%

FIG. 5

ADAPTABLE ON-DEPLOYMENT LEARNING PLATFORM FOR DRIVER ANALYSIS OUTPUT GENERATION

CROSS-REFERENCE TO RELATED APPLICATIONS

This application is a continuation of and claims the benefit of and priority to U.S. application Ser. No. 18/130,125, filed on Apr. 3, 2023, and entitled "Adaptable On-Deployment Learning Platform for Driver Analysis Output Generation" which is a continuation of U.S. application Ser. No. 16/580,353, filed on Sep. 24, 2019, and is issued as U.S. Pat. No. 11,620,494 on Apr. 4, 2023, and entitled "Adaptable On-Deployment Learning Platform for Driver Analysis Output Generation", which claims the benefit of U.S. Provisional Patent Ser. No. 62/736,783, filed Sep. 26, 2018, and entitled "Adaptable On-Deployment Learning Platform for Driver Analysis Output Generation". Each of these applications is incorporated by reference in its entirety herein.

BACKGROUND

Aspects of the disclosure relate to enhanced processing systems for providing dynamic driving metric outputs using improved machine learning methods. In particular, one or more aspects of the disclosure relate to sensor data that may be used to generate driving metrics.

Many organizations and individuals rely on driving metrics, such as a driver's skill level, in performing driver safety and performance. In many instances, sensor data may be analyzed to determine driving metrics such as the output score of a predictive risk model, the output score of a driver evaluation model, and others. However, this situation may present limitations because particular driving factors that reflect particular characteristics of the individual driver may be ignored in the driving analysis due to their complexity or because they are difficult to obtain. There remains an ever present need to develop alternative solutions for determining driving metrics using sensor data that account for the individual driver's characteristics so that the outputs of the solutions are customized to the individual driver.

SUMMARY

Aspects of the disclosure provide effective, efficient, scalable, and convenient technical solutions that address and overcome the limitations of contemporary driving analysis methods. In accordance with one or more embodiments of the disclosure, a computing platform comprising at least one processor, a communication interface, and memory storing computer readable instructions may receive, from one or more vehicle sensors, sensor data inputs. For one or more of the sensor data inputs, the computing platform may generate a pattern deviation output corresponding to an output of a sensor data analysis model, an actual outcome associated with a lowest time to collision (TTC) value, and a sequence of driving actions that occurred over a prediction horizon corresponding to the pattern deviation output. The computing platform may cluster the pattern deviation outputs to maximize a ratio of inter-cluster variance to intra-cluster variance. The computing platform may train a long short term memory (LSTM) for each cluster. Based on the LSTM for each cluster, the computing platform may verify consistency of the pattern deviation outputs in each cluster. After verifying the consistency of the pattern deviation outputs in each cluster, the computing platform may modify the sensor data analysis model to reflect pattern deviation outputs associated with verified consistency.

In one or more instances, the prediction horizon may be a duration over which collision prediction is estimated. In one or more instances, the computing platform may determine an error value corresponding to a difference between an estimated TTC value and the lowest TTC value for each of the sensor data inputs. The computing platform may group each of the sensor data inputs based on whether the estimated TTC value exceeds a predetermined TTC threshold. For each group, the computing platform may rank each of the sensor data inputs based on their corresponding error values. The computing platform may determine, for each group and by determining that the error values corresponding to each subset of the sensor data inputs exceeds a predetermined error threshold, a subset of the sensor data inputs.

In one or more instances, each group may be associated with a different predetermined error threshold. In one or more instances, the one or more of the sensor data inputs may correspond to the subsets of the sensor data inputs.

In one or more instances, the computing platform may predict, for each cluster (e.g., clauses that may correspond to pattern deviations) and using the trained LSTMs, a subsequent driver action. In one or more instances, the LSTMs may be trained on a subset of the pattern deviation outputs for each cluster based on similarity of their sequences of driving actions, and the similarity of their sequence of driving actions may be determined based on Euclidian distance.

In one or more instances, after training the LSTMs on the subset of the pattern deviation outputs for each cluster, the computing platform may apply the LSTMs to the remaining pattern deviation outputs in their respective clusters to determine additional error values. The computing platform may incorporate a first subset of the remaining pattern deviation outputs into future LSTM training after determining that additional error values corresponding to the first subset of the remaining pattern deviation outputs are below a predefined LSTM training threshold. The computing platform may discard a second subset of the remaining pattern deviation outputs after determining that additional error values corresponding to the second subset of the remaining pattern deviation outputs exceed the predefined LSTM training threshold.

In one or more instances, the computing platform may train the LSTM for each of the clusters by performing training over a beginning portion of the sequence of driving actions. After performing the training over the beginning portion of the sequence of driving actions and before performing training over a final portion of the sequence of driving actions, the computing platform may perform training over one or more middle portions of the sequence of driving actions. The middle portions of the sequence of driving actions may occur after the beginning portion of the sequence of driving actions and before the final portion of the sequence of driving actions. The training over the one or more middle portions of the sequence of driving actions may occur one middle portion at a time. After performing the training over the middle portions of the sequence of driving actions, the computing platform may perform training over the final portion of the sequence of driving actions, wherein the final portion of the sequence of driving actions occurs after the middle portions of the sequence of driving actions.

In one or more instances, the computing platform may determine, after training the LSTM for each of the clusters, clusters associated with different groups but with similar sensor data inputs. The computing platform may store an indication of the determined clusters.

In one or more instances, the computing platform may modify the sensor data analysis model by incorporating the pattern deviation outputs into training of the sensor data analysis model. In one or more instances, the computing platform may establish a wireless data connection with a driver analysis output platform. While the wireless data connection is established, the computing platform may send, to the driver analysis output platform, driving analysis output information corresponding to analysis of the sensor data inputs, wherein sending the driving analysis output information causes the driver analysis output platform to generate, using the driving analysis output information, a driving analysis output corresponding to feedback on a user's driving ability.

BRIEF DESCRIPTION OF THE DRAWINGS

The present disclosure is illustrated by way of example and not limited in the accompanying figures in which like reference numerals indicate similar elements and in which:

FIG. 5 depicts a graphical user interface for an adaptable on-deployment learning platform that utilizes improved machine learning methods and that is permanently learning in accordance with one or more example arrangements discussed herein.

DETAILED DESCRIPTION

Figure 1:
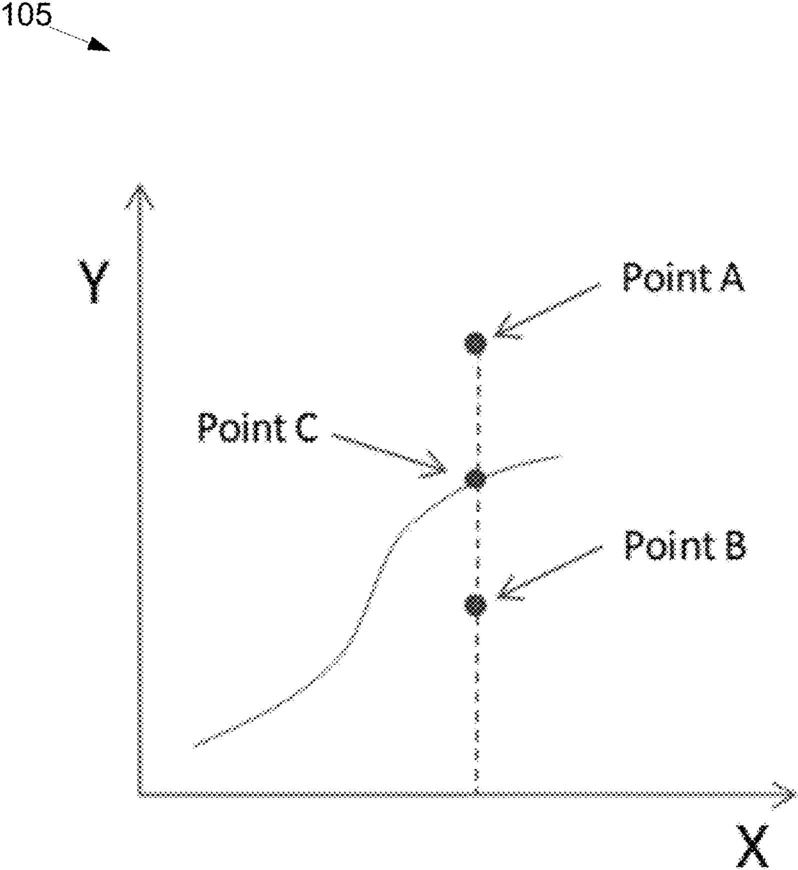
FIG. 1 depicts an illustrative sketch of a problem to be solved by deploying an adaptable on-deployment learning platform that utilizes improved machine learning methods and that is permanently learning in accordance with one or more example arrangements discussed herein.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

This disclosure is applicable specifically to risk models that allow prediction of risk for drivers based on information collected from driving through camera, light detection and ranging (LIDAR), radar sensors, or the like. The major aim is to adapt the risk model to the particular characteristics of the driver in an on-line manner.

Risk models in the more general case may use a corpus of data to train a model that, based on some input variables, may be able to provide an output that delivers an assessment of the level of risk that a given driver experiences. This assessment may be delivered through a score metric that captures a range of different levels of risk. The risk model in principle may be trained to capture different patterns of arrangement for values of the input variables so that an output that accurately captures the level of risk may be generated for such pattern. The risk model may be based on a probability measure that may be derived either from a surrogate metric of collision risk or determined by some other means. Several studies and developments for risk models that exist work with surrogate metrics for collision such as low time-to-collision (TTC) events, whereas the present disclosure implements such surrogate metrics in the described risk models. Therefore, the risk models developed and described herein might not only be tested and validated through dataset verification, but also through validation on real-life deployment.

Arrangements described herein may identify driving patterns that significantly deviate from patterns belonging to the corpus of data that was used to train the original risk model and retrain, on-deployment, the risk model by incorporating these newly found patterns. For this purpose, this disclosure describes arrangements to detect and to incorporate the new patterns.

One of the cornerstone characteristics of a machine learning based system is the fact that the model inferred/developed by the system may always be generated based on some collection of data (e.g., a dataset, data taken from real-life, synthetic data, or the like) that provides the source information for model generation. Accordingly, one common characteristic that may always be present on all such systems is the fact that the source dataset used for model training almost invariably contains just a subset of all the possible information that will be present in a real-life deployment of the system. It may be expected that given the capabilities of machine learning, it is possible to deliver a reasonably accurate inference under incomplete information.

Additionally, a machine learning system may be expected to deliver a model that may be generalizable to all the situations faced in real-life deployment and precisely for this reason the machine learning model may be expected to avoid over-fitting the data in the dataset precisely because the dataset may be expected to be an incomplete representation of all the information found in real-life and over-fitting would lead to incorrect inferences. Therefore, given the dataset as a sample of the type of information to be found in real-life, the machine learning model may be expected to extract just some fundamental components/features from the data, so that the output estimations may be mostly correct even though an obvious inaccuracy may be present on the estimation. Additionally, all data may include some degree of noise and over-fitting in the presence of noise may also lead to incorrectly inferring the model.

Another aspect of machine learning systems may be the situation where the inputs to the system may always be a subset of all the inputs that influence the variable that the system is estimating. The reason for this limitation may be one of availability. There may almost always be inputs that might not be included in the design/specification of the machine learning system because these inputs may be difficult to obtain or difficult to measure. In one or more instances, sensor unavailability (due to hardware restrictions) may make a given input unavailable. Additionally or alternatively, the nature of the input information may be so complex that for practical purposes it might not be possible to include such input on the machine learning system design. For example, in case of a security system based on video that may be designed to detect threats, it may be very difficult (or almost impossible) to infer from the video of the person his or her personal history and background.

The limitations imposed by machine learning described above may cause potential issues. In case of risk models developed based on collection of data (from datasets and/or synthetic data), the information may usually be incomplete since the problem of driving on roads (highway, suburban, urban, rural, or the like) involves an extremely wide diversity of scenarios including a multitude of different interactions. Additionally, given the wide variety/diversity of driving scenarios generalization in the usual sense applied by machine learning may be very difficult to achieve. For a given user of the risk model, some driving scenarios may be more critical than others and thus generalization might not be the best approach in this case (since a more accurate inference may be provided if the machine learning system would be allowed to train more and with greater accuracy on the critical scenarios than on the rest of the scenarios). Finally, risk models involve several inputs, however they might not include all the inputs that influence driver action. For instance, driver skill, driver impairment, and driver frustration are not part of a risk model inputs because it may be very complex to measure these inputs. Therefore, the problem may be that the risk model may be blind to these inputs, resulting in generation of a compromised machine learning solution. This is described with regards to sketch 105, which is shown in FIG. 1.

FIG. 1 shows a regression curve for a hypothetical machine learning system trained to estimate output variable Y for an input variable X by means of regression. In this instance, it may be assumed that variable Y in reality may be influenced by input variable X and input variable Z, however, limitations/unavailability of variable Z may result in the situation depicted in FIG. 1 with the two data-points shown. In this instance, training data-point A and training data-point B may have the same X value, however they may have a different Z value. Both data points may generate different Y values because they may have different Z values (even though they have the same X value), however since the regression system may only see the X value, it may determine a compromise solution for the regressed point which may become point C, which may provide the estimated output at the X value of points A and B. However, using the methods described herein, a more accurate solution for points A and B may be determined.

For instance, such accuracy may be improved by developing a system that provides the risk model with the ability to adapt to the actual real-world driving scenarios found upon deployment. This ability may allow for a more complete set of the training data, it may resolve the tradeoff between generalization and greater accuracy, and may provide a way to account for unseen input variables in the system. The system described herein provides an adaptable learning system that might not cease to learn.

Additionally, there may be a pattern that might not have been part of the original training set and it may just need incorporation to the model's training.

Figure 2A:
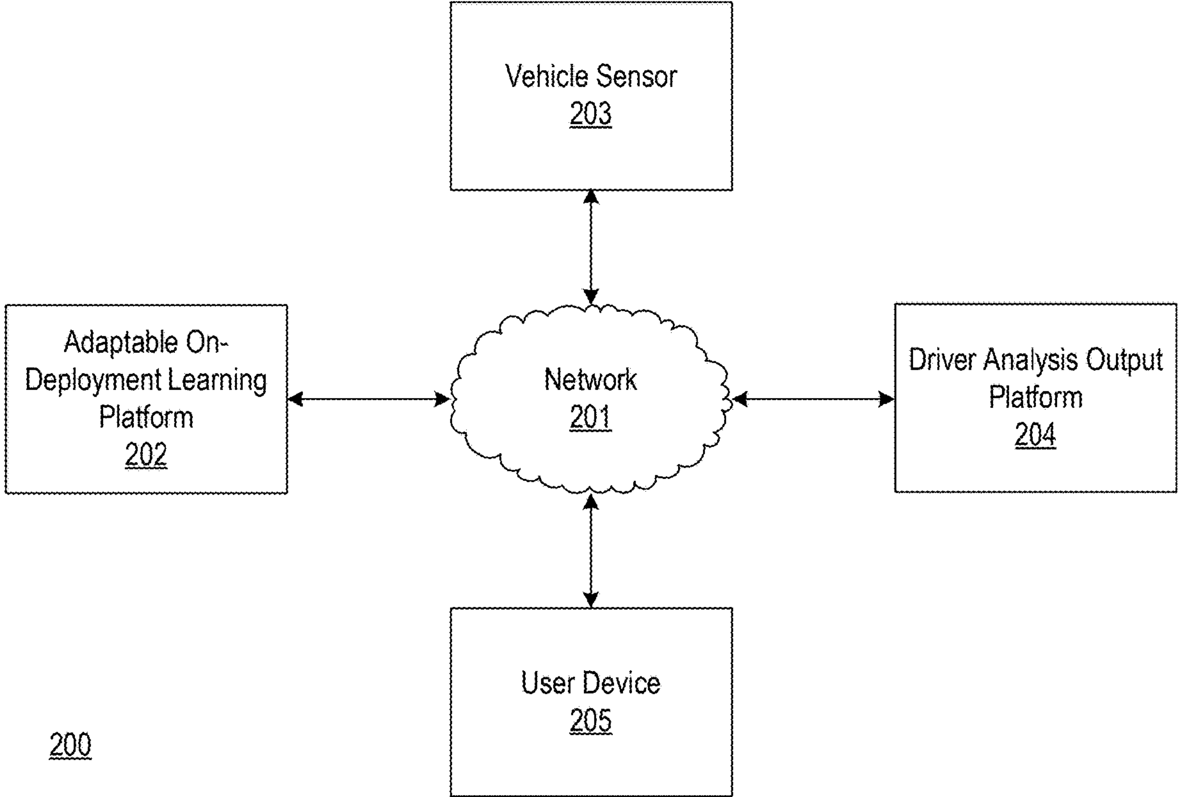
FIGS. 2A and 2B depict an illustrative computing environment for deploying an adaptable on-deployment learning platform that utilizes improved machine learning methods and that is permanently learning in accordance with one or more example arrangements discussed herein.
Figure 2B:
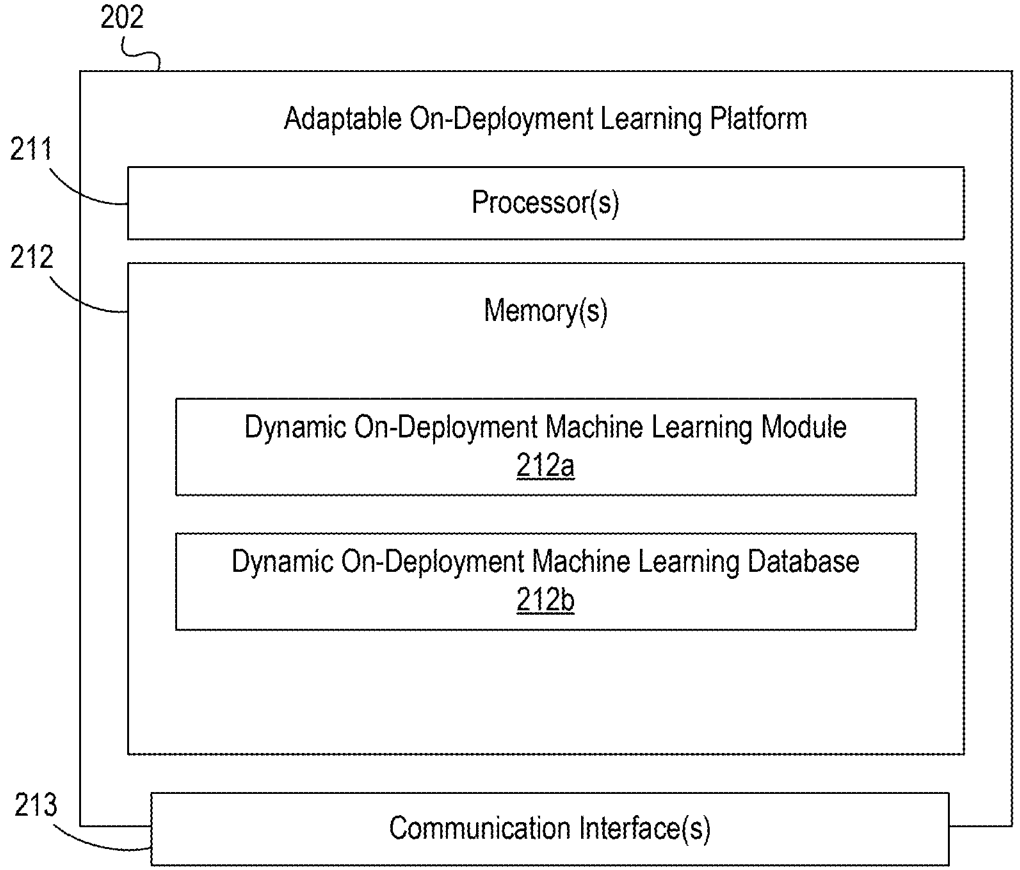

FIGS. 2A and 2B depict an illustrative computing environment 200 for deploying an adaptable on-deployment learning platform 202 that utilizes improved machine learning methods in accordance with one or more example embodiments. Referring to FIG. 2A, computing environment 200 may include one or more computer systems. For example, computing environment 200 may include an adaptable on-deployment learning platform 202, a vehicle sensor 203, a driver analysis output platform 204, and a user device 205.

As illustrated in greater detail below, adaptable on-deployment learning platform 202 may include one or more computing devices configured to perform one or more of the functions described herein. For example, adaptable on-deployment learning platform 202 may include one or more computers (e.g., laptop computers, desktop computers, servers, server blades, or the like) configured to receive sensor data, generate machine learning datasets using the sensor data, and perform machine learning algorithms on the sensor data.

Vehicle sensor 203 may be a motion sensor, accelerometer, speedometer, position sensor, camera, or the like. Vehicle sensor 203 may be configured to receive sensor data and send the sensor data to the adaptable on-deployment learning platform 202. In one or more instances, the vehicle sensor 203 may be integrated into a mobile device. Although computing environment 200 as shown includes a single vehicle sensor 203, it should be understood that the computing environment 200 may include any number of vehicle sensors 203 similar to vehicle sensor 203.

Driver analysis output platform 204 may be a computing platform capable of generating a driver analysis output based on the machine learning analysis performed by the adaptable on-deployment learning platform 202. In some instances, the driver analysis output platform 204 may be configured to receive machine learning results from the adaptable on-deployment learning platform 202, determine a driver analysis output based on the machine learning results, and send the driver analysis output to a user device 205.

In addition, and as illustrated in greater detail below, the driver analysis output platform 204 may be configured to generate, host, transmit, and/or otherwise provide one or more web pages and/or other graphical user interfaces (which may, e.g., cause one or more other computer systems to display and/or otherwise present the one or more web pages and/or other graphical user interfaces). In some instances, the web pages and/or other graphical user interfaces generated by driver analysis output platform 204 may be associated with an external portal provided by an organization, such as a driver evaluation portal provided by an insurance institution or provider.

User device 205 may be a computing device (e.g., a desktop computer, laptop computer, tablet computer, smart phone, or the like) that may be used to receive or otherwise access the driver analysis outputs from the driver analysis output platform 204 and to cause display of the driver analysis outputs. For example, the user device 205 may be used by a customer an insurance institution to analyze his or her driving quality.

Computing environment 200 also may include one or more networks, which may interconnect one or more of adaptable on-deployment learning platform 202, vehicle sensor 203, driver analysis output platform 204, and user device 205. For example, computing environment 200 may include a network 201 (which may, e.g., interconnect adaptable on-deployment learning platform 202, vehicle sensor 203, driver analysis output platform 204, and user device 205).

In one or more arrangements, adaptable on-deployment learning platform 202, vehicle sensor 203, driver analysis output platform 204, user device 205, and/or the other systems included in computing environment 200 may be any type of computing device capable of receiving a user interface, receiving input using the user interface, and communicating the received input to one or more other computing devices. For example, adaptable on-deployment learning platform 202, vehicle sensor 203, driver analysis output platform 204, user device 205, and/or the other systems included in computing environment 200 may, in some instances, be and/or include server computers, desktop computers, laptop computers, tablet computers, smart phones, or the like that may include one or more processors, memories, communication interfaces, storage devices, and/or other components configured to perform particular functions described herein. As noted above, and as illustrated in greater detail below, any and/or all of adaptable on-deployment learning platform 202, vehicle sensor 203, driver analysis output platform 204, and user device 205 may, in some instances, be special-purpose computing devices configured to perform specific functions.

Referring to FIG. 2B, adaptable on-deployment learning platform 202 may include one or more processors 211, memory 212, and communication interface 213. A data bus may interconnect processor 211, memory 212, and communication interface 213. Communication interface 213 may be a network interface configured to support communication between adaptable on-deployment learning platform 202 and one or more networks (e.g., network 201, or the like). Memory 212 may include one or more program modules having instructions that when executed by processor 211 cause adaptable on-deployment learning platform 202 to perform one or more functions described herein and/or one or more databases that may store and/or otherwise maintain information which may be used by such program modules and/or processor 211. In some instances, the one or more program modules and/or databases may be stored by and/or maintained in different memory units of adaptable on-deployment learning platform 202 and/or by different computing devices that may form and/or otherwise make up adaptable on-deployment learning platform 202. For example, memory 212 may have, store, and/or include an adaptable on-deployment machine learning module 212*a* and an adaptable on-deployment machine learning database 212*b*. Adaptable on-deployment machine learning module 212*a* may have instructions that direct and/or cause adaptable on-deployment learning platform 202 to execute advanced machine learning techniques for driver evaluation, as discussed in greater detail below. Adaptable on-deployment machine learning database 212*b* may store information used by Adaptable on-deployment machine learning module 212*a* and/or adaptable on-deployment learning platform 202 in driver evaluation and/or in performing other functions.

FIGS. 3A-3E depict an illustrative event sequence for deploying an adaptable on-deployment learning platform 202 that utilizes improved machine learning methods to perform driver evaluation in accordance with one or more example embodiments. The system described herein is based on a group of arrangements intended to address the limitations of risk models mentioned previously. One benefit of such systems may be the possibility to customize the risk model development to incorporate the specific characteristics of the user of the model. One advantage for the system described herein is the fact that the driving scenarios that may be critical to the user may be readily available since the system has been deployed. This may provide the ability to emphasize the critical scenarios over the rest of the training data. Another benefit may be the fact that the methods described below may help to address the fact that the effect of the unseen variables is accounted for, which may help to deliver a more accurate risk model for the user without explicit modeling of these unseen variables.

The system described herein is intended to work initially with a set of information collected after deployment (after an initial period of time for observation and data capture). After the adaptation/customization of the model is complete, as the procedures below will describe, the adaptation process may continue indefinitely. There may be a variety of reasons for permanent adaptation. The user driver (especially novice drivers) may experience an improvement of the driving skills over time and therefore the on-line adaptable risk model may continue adapting to modify the risk model accordingly to better reflect risk given the improved skills. Similarly, on the other hand, a reduction in the driving abilities/skill due to temporal or long term physiological and/or psychological processes (aggravated stress, or the like) may be captured by the on-line adaptable risk model so that it accurately reflects the new situation and the adjustments to the risk estimations may be performed accordingly. Similarly, familiarity with the driving scenario is something that might not be static either, and in this case the driver may be expected to improve his driving with the increased familiarity with the driving scenario, which may use continuous and permanent adaptation. On the other hand, given human nature, the driver may forget over time driving scenarios he or she is familiar with due to multiple reasons such as moving to live, working in a different location, moving to a different state or country, or the like, which may have an effect such as a reduction of driving skills when facing the previously familiar scenarios again. As it can be seen, permanent adaptation of the risk model may be of paramount importance on the development of a system described herein, and thus it may provide an advantage over other conventional risk models.

Figure 3A:
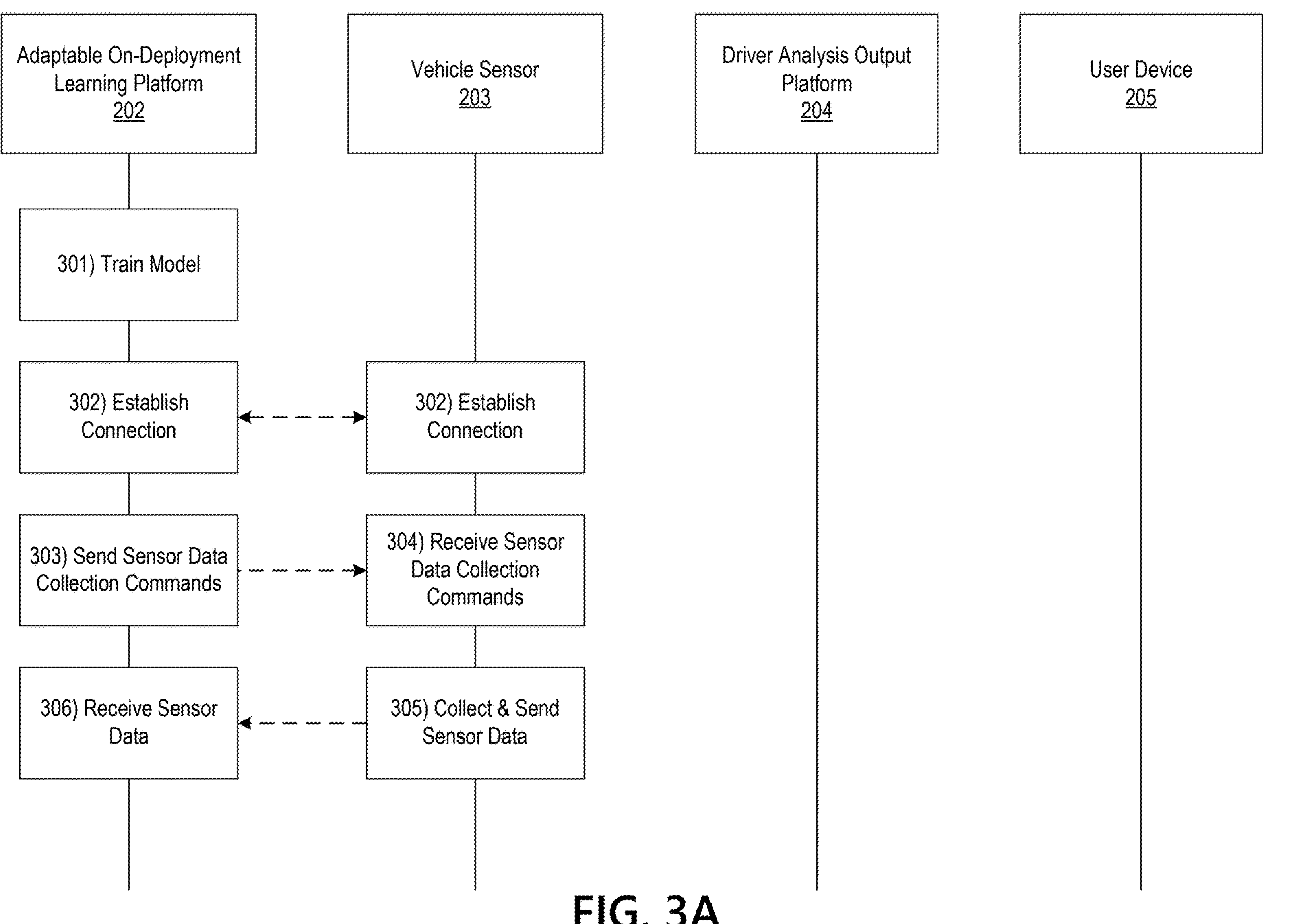
FIGS. 3A-3E depict an illustrative event sequence for deploying an adaptable on-deployment learning platform that utilizes improved machine learning methods and that is permanently learning in accordance with one or more example arrangements discussed herein.

Referring to FIG. 3A, at step 301, the adaptable on-deployment learning platform 202 may train a risk model (referred to herein as the original risk model) that has been previously trained on a dataset and is deployed on a vehicle. At step 302, the vehicle sensors 203 may establish a connection with the adaptable on-deployment learning platform 202. In one or more instances, the vehicle sensors 203 may establish a first wireless data connection with the adaptable on-deployment learning platform 202 to link the vehicle sensors 203 to the adaptable on-deployment learning platform 202.

At step 303, the adaptable on-deployment learning platform 202 may generate and send one or more commands directing the vehicle sensors 203 to collect sensor data. In one or more instances, the adaptable on-deployment learning platform 202 may send the one or more commands directing the vehicle sensors 203 to collect sensor data while the first wireless data connection is established.

At step 304, the adaptable on-deployment learning platform 202 may receive the one or more commands directing the vehicle sensors 203 to collect the sensor data. In one or more instances, the adaptable on-deployment learning platform 202 may receive the one or more commands directing the vehicle sensors 203 to collect the sensor data while the first wireless data connection is established.

At step 305, after the risk model is activated, and in response to the commands received at step 304, the vehicle sensors 203 may start acquiring inputs (e.g., velocity, distances, speed, accelerations, time, position, or the like). In one or more instances, the inputs to the risk model may refer to an array of values that corresponds to the following list of attributes: lane offset, lane heading, absolute velocity, vehicle length/width, acceleration, turn rate, measured time to collision (this may be a simple measure of distance to next vehicle divided by current speed, thus might not be an estimation related to the TTC that is discussed later), relative distance to other vehicles, positions of surrounding vehicles, relative speeds, acceleration of other vehicles, or the like. Therefore, when we mention the word "input" below in reality we are referring to an array of values coming from the attributes mentioned, so each "input" is an array.

At step 306, the adaptable on-deployment learning platform 202 may receive the sensor data from the vehicle sensors 203. In one or more instances, the adaptable on-deployment learning platform 202 may receive the sensor data via the communication interface 213 while the first wireless data connection is established.

Figure 3B:
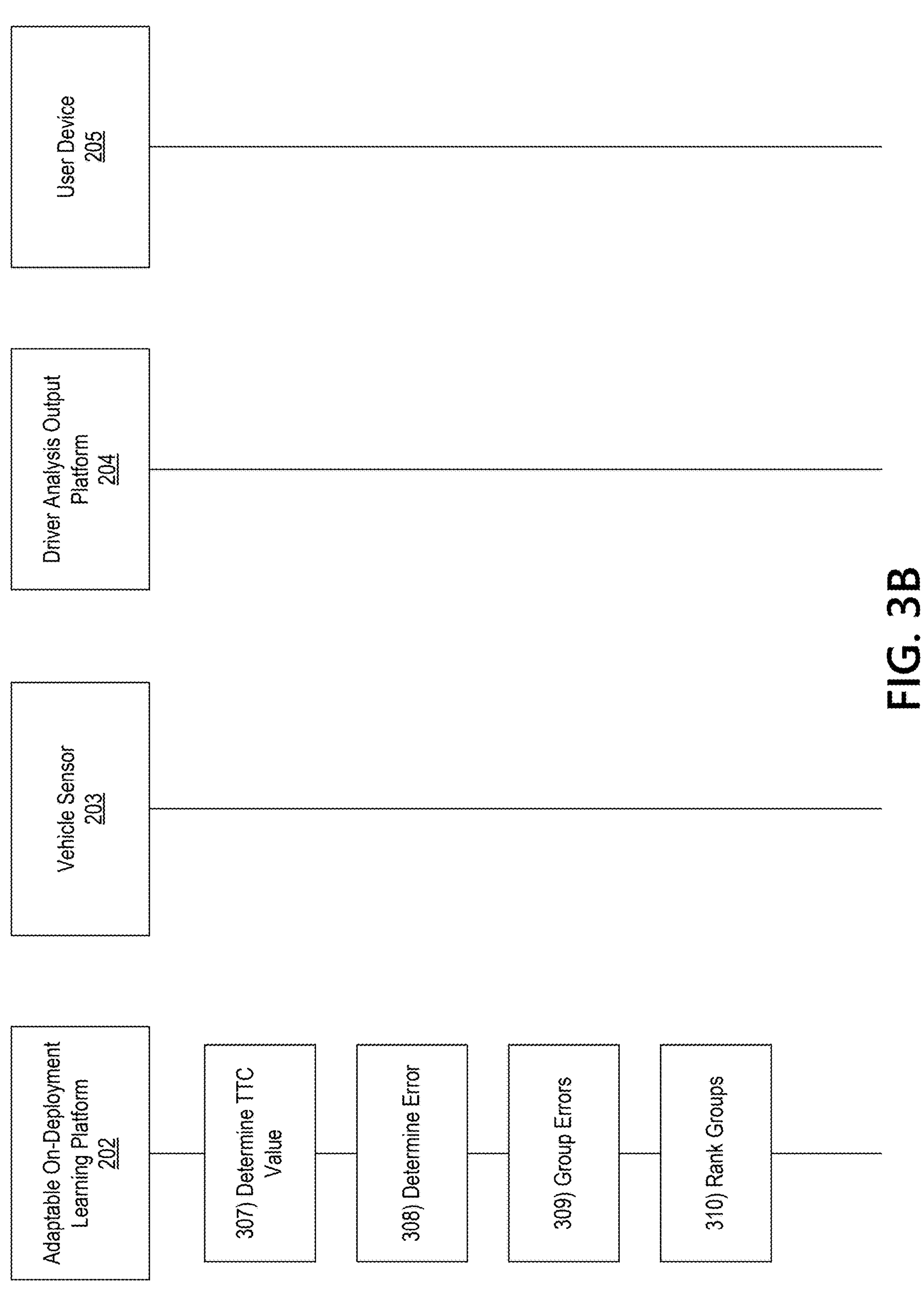

Referring to FIG. 3B, at step 307, the adaptable on-deployment learning platform 202 may determine the risk model output corresponding to the input, and the lowest TTC value that actually occurred over the prediction horizon for each input. In at least some examples, time to collision is defined as the time that it will take for a vehicle to collide with another vehicle if a current speed is maintained. The lowest TTC value that could occur over a prediction horizon may be considered a prediction parameter for risk on the road. A prediction horizon is the interval of time over which a risk prediction system will attempt to predict the lowest TTC value that will happen (e.g., the period of time in the future over which the prediction of risk is being estimated). For instance, a prediction horizon could be various time periods, such as 10 seconds or 20 seconds. Sometimes instead of predicting the lowest TTC value, a low TTC event is predicted and this event is detected if a low TTC value below a predetermined threshold occurs within the prediction horizon interval. For instance, if a TTC value is lower than 3 seconds (so the threshold is 3 seconds) within a prediction horizon of 20 seconds then we have a low TTC event.

In some examples of prediction of low TTC events, the prediction horizon may be the period of time (it could be 10 seconds, 20 seconds, etc.) where the low TTC event should occur if the prediction is going to be successful. The prediction horizon could be understood as a "look ahead" period of time. For example, as discussed above, a low TTC event is determined by the occurrence of a TTC value below a predetermined threshold. At step 308, the adaptable on-deployment learning platform 202 may compute an error between the estimated time-to-collision (TTC) event and the lowest time-to-collision value observed over the prediction horizon to detect these patterns that deviate from the training (the particular procedure to compute the error is described below). In one or more instances, an estimation error may have the risk model predicting a low TTC event when it actually did not occur as well as having predicted no low TTC event when it did occur.

In some examples, the computing platform may determine an error value corresponding to a difference between an estimated lowest TTC value and the actual lowest TTC value for each of the sensor data inputs. This difference between estimated and actual values may indicate that the predictive risk model is failing due to the inability of the model to account for the characteristics of the driving skill that corresponds to the driver for which the risk prediction system is working. In some examples, an adjustment to the risk model may be made to account for this difference. The actual lowest TTC value that occurs at every point in time can be continuously verified on-deployment by one or more systems or arrangements described herein the projected vehicle trajectory may be measured based on assuming constant speed and verified if a collision will occur over, a predetermined time, such as a next or subsequent 3 seconds, 5 seconds or the like.

At step 309, for all the inputs that generated an estimation error, the adaptable on-deployment learning platform 202 may generate two groups: the first group may include all the errors where a low TTC event was predicted and the second group includes all the errors where it was predicted that no low TTC event was going to occur. It should be understood that additional or alternative groupings may be used without departing from this disclosure.

At step 310, the adaptable on-deployment learning platform 202 may rank these two groups based on the error generated. In one or more instances, the adaptable on-deployment learning platform 202 may compute for the first group the delta between the minimum TTC value observed over the prediction horizon, and the threshold for the low TTC event detection. For the second group, the adaptable on-deployment learning platform 202 may compute a delta between the threshold for the low TTC event detection and the minimum TTC value observed over the prediction horizon. The purpose of these computations may be to obtain a measure of the level/degree of deviation that existed between the actual real-life outcome and the prediction/estimation delivered by the original risk model.

For each of the two groups mentioned above, the adaptable on-deployment learning platform 202 may rank all the inputs that resulted in an estimation error based on the delta value mentioned above from highest to lowest.

Figure 3C:
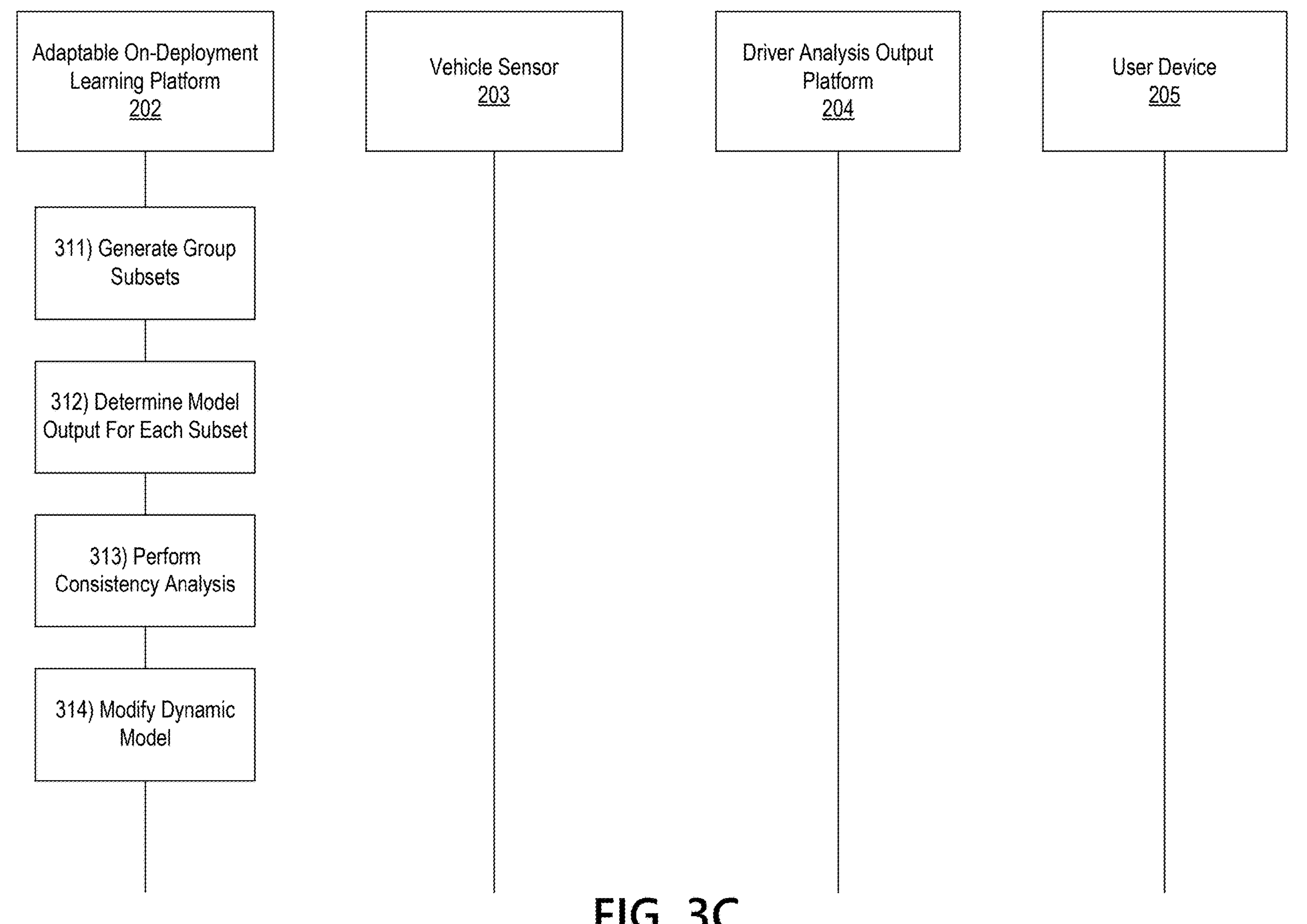

Referring to FIG. 3C, at step 311, the adaptable on-deployment learning platform 202 may, for each one of the two groups, determine all the inputs in the upper portion of the rank above a predetermined threshold referred to as the pattern deviation threshold (a different threshold may be determined for each of the two groups). In one or more instances, the pattern deviation threshold allows the adaptable on-deployment learning platform 202 to consider only the inputs that produced significant error on the risk model. Therefore, in one or more instances, there may be two subsets of selected inputs that come from the upper portions of the ranks for the first and the second group.

At step 312, for each selected input, the adaptable on-deployment learning platform 202 may record the corresponding output of the risk model, the corresponding actual outcome of the low TTC event over the prediction horizon corresponding to the selected input, and the sequence of driving actions that occurred over the prediction horizon time period. This recorded information may be useful in performing the consistency analysis described below.

At step 313, after detections of pattern deviations are performed over time, a consistency process may be initiated by the adaptable on-deployment learning platform 202 with regard to all the patterns deviations that are detected. From the detection process described previously, the adaptable on-deployment learning platform 202 may have a selected group of inputs that generated significant error and that have been extracted from all the inputs generated by the on-the-field deployment of the risk model. In one or more instances, the significant error may be error that exceeded a predetermined error threshold. Initially, the adaptable on-deployment learning platform 202 may consider that each input is a deviated pattern and may proceed to analyze the consistency of these deviated patterns. An example of a deviated pattern may be a set of inputs for a given initial scenario as previously described and a prediction by the original risk model of a low TTC event that is opposite of what happened in real-life for this initial scenario. More specifically, a driving scenario involving a lane change maneuver may involve a prediction of risk by the original model that may indicate that over the horizon there might not be a low TTC event. However, the real-life outcome may have actually indicated that there was a low TTC event seconds later before the horizon window expired due to the inexperience of the novice user-driver who may have used too much lateral acceleration to perform the lane change maneuver.

There may be three components for every deviated pattern. The first component may be the driving scenario may be associated with the pattern. In this case, the scenario may include the input array that is fed into the risk model. The second component may include the driver actions that are the result of the driving scenario. In this case, the adaptable on-deployment learning platform 202 may consider the full sequence of individual driver actions that occur over the period of time corresponding to the horizon for prediction that the risk model involves. The third component may be the evolution of the driving scenario, which may depend on the driver actions and on the actions of the surrounding drivers.

The adaptable on-deployment learning platform 202 may apply unsupervised learning to the deviated patterns and cluster them together on a number of clusters so that the ratio of inter-cluster variance to intra-cluster variance is maximized. For this process, the adaptable on-deployment learning platform 202 may generate vectors that may be made of the first component of the deviated pattern (which may be the input to the risk model) and the immediate driver actions that followed after the time when the input was acquired (in some instances, the adaptable on-deployment learning platform 202 may include only the first set of driver actions from the total sequence of driver actions that followed over the period of time corresponding to the horizon for prediction, for instance the first set of driver actions is made of the driver actions that occurred over the first 3 seconds after the input was acquired even though the horizon is 10 seconds). In one or more instances, these deviated patterns may be clustered to account for small variations of the input variables (the variables are the attributes mentioned above that the input array is made of) around a given pattern that elicits a particular driver response. The actions of the driver may be included as part of the clustering (even though the risk model may only account for inputs and risk scores).

The adaptable on-deployment learning platform 202 may take the clusters generated in the previous step and consider all the driving actions over the horizon corresponding to each deviated pattern (so the adaptable on-deployment learning platform 202 may consider not only the actions that followed immediately after the input, but the sequence over the whole horizon). In one or more instances, the sequence of driver actions over the horizon of prediction may be taken as an indicator that provides insight into all the influencing factors that affect the user's driving. The list of driver actions may include absolute speed, absolute longitudinal acceleration (includes breaking which is negative acceleration), absolute lateral acceleration (includes breaking which is negative acceleration), turn rate, vehicle heading, lane change action, or the like.

Each deviated pattern in the cluster may have a level of similarity that may indicate that all the patterns have a common set of influencing factors. Therefore, the adaptable on-deployment learning platform 202 may verify that this is the case by training incrementally a LSTM (long short term memory; one LSTM for each cluster). The sequence of driver actions may be trained so that the LSTM may be able to predict the next driver action. The LSTM may be trained on a reduced group of deviated patterns which may be the patterns that present the greatest similarity in terms of their sequence of driving actions (the similarity may be computed based on Euclidian distance). For each deviated pattern, initially the training may be performed over the first part of the sequence which may include the first driver actions taken at the beginning portion of the horizon (the first seconds) corresponding to the deviated pattern. The next driver action (this will be the action that follows after the last action from the first part mentioned) may be used as a label for training. Then, after the previous training is completed the adaptable on-deployment learning platform 202 may apply a moving window to select a new set of driver actions from the sequence but this time the adaptable on-deployment learning platform 202 may start at the second driver action on the sequence and the last action of the window may be precisely the driver action that was used previously as a label. The label for this new training may become the next driver action following the action that was used previously as a label. After training the last set of driving actions, the adaptable on-deployment learning platform 202 may proceed to move the window and perform a new training until all the sequence on the horizon is exhausted. This may be repeated for each deviated pattern that was selected for LSTM training. After all the LSTM trainings are completed, the adaptable on-deployment learning platform 202 may proceed to go over the rest of the deviated patterns in the cluster and observe the errors produced by the LSTM when applying the sequence of actions to it. If the errors are low (below a predefined threshold), the adaptable on-deployment learning platform 202 may incorporate that new deviated pattern for LSTM training and if the error is high then the adaptable on-deployment learning platform 202 may discard such deviated pattern. For these patterns in the cluster that the LSTM has provided successful prediction, the adaptable on-deployment learning platform 202 may record them and identify them as a specific driving pattern that the user consistently applies given the scenario (the input) that corresponds to the given cluster. This may complete the consistency analysis. The fact that there may be sequences of actions that the LSTM might not be able to predict may indicate that the sequence of driver actions may be influenced by external factors such as other drivers performing maneuvers that may induce deviations of the user's actions. The adaptable on-deployment learning platform 202 may record the sequence of scenarios as they evolve through the horizon as further validation of this in order to observe the discrepancies in such cases with the sequence of scenarios for the cases of successful LSTM prediction. Additionally, it may be possible that within the cluster, the adaptable on-deployment learning platform 202 may have more than one consistent driving pattern, which may point to the fact of having the same initial scenario (same input) and then having two or more separate influencing factors acting to induce driving patterns. This may be detected by performing a new consistency analysis as described above but this time over the patterns that were discarded previously. An example of a consistent deviated pattern may be the one provided by an initial scenario for a typical car following where a gap exists between the user and the lead vehicle. In this example, if a car appears that tries to cut in front of the user-driver and this other vehicle starts performing a lane change maneuver, the inexperienced user may accelerate, increasing the vehicle absolute speed with a high acceleration curve in an attempt to block the car that is trying to move into his or her lane. This may be a repetitive situation that always occurs when another driver tries to move in front of the user and the original risk model might not account for this very specific habit of the user and thus the estimated risk provided by the original model may always be wrong in this situation. The adaptable model described herein may be in the position to perform the appropriate adaptation/modification to accurately reflect risk.

One final verification may be performed by the adaptable on-deployment learning platform 202 in order to detect these clusters that, even though belong to different groups (either the first group for errors of predicting false low TTC events or the second group for errors of failing to predict a valid low TTC event), have similar inputs. In one or more instances, this may result in a contradiction on the original risk model. The contradiction may happen when two very similar scenarios provide opposed estimations. The reason for the contradiction may be that the original risk model may be blind to another influencing factor that may be inducing the opposite outcomes in both cases. One example of this may be the same initial scenario (same inputs) under user impairment (e.g., drunkenness) in one case and sobriety in the other case. The same input may lead to two different outcomes. The consistency module presented herein may record all such cases.

One example benefit of the arrangements described herein may be the philosophy and the understanding that the driver actions are in reality a language, which may convey all the influencing factors that were involved in the driving. This may be the case when the adaptable on-deployment learning platform 202 applies a LSTM to verify the alignment of the patterns. Further, the adaptable on-deployment learning platform 202 may be performing LSTM training to predict the next driving action not because the adaptable on-deployment learning platform 202 is attempting to deliver driver action prediction, but to verify that the sequences of driving actions may be similar enough in order to determine that they may be consistent. In one or more instances, a dynamic Bayesian network may be used instead of a LSTM to perform the same type of consistency analysis that was described above.

At step 314, once the deviated patterns have been detected and their consistency has been established, the adaptable on-deployment learning platform 202 may perform modification to the risk model. For the deviated patterns where the consistency analysis showed that there was only one driving pattern in the cluster, the adaptable on-deployment learning platform 202 may assume that given the initial driving scenario (or in other words given the inputs to the risk model) there may have been only one influencing factor besides the factors already factored into the input to the risk model. In these instances, the driver may show consistency on the actions performed given the initial scenario and therefore the risk model may be inaccurate for this deviated pattern and the adaptable on-deployment learning platform 202 may determine that the risk model should be modified. In these instances, the adaptable on-deployment learning platform 202 may incorporate the deviated pattern into the training of the risk model.

In one or more instances, the re-training of the risk model may be accomplished by reusing the corpus of training data that was originally used to train the model. In these instances, the adaptable on-deployment learning platform 202 may locate the data-point that is most similar to the deviated pattern (by comparing the input of the data-point of the corpus with the input of the deviated pattern using Euclidian distance) as well as some additional data-points that are also similar to the deviated pattern. Then, the adaptable on-deployment learning platform 202 may proceed to replace, in the corpus, the selected data-points with the inputs of the deviated pattern singled out for re-training. The adaptable on-deployment learning platform 202 may then perform batch training (or mini-batch training) of the risk model and modify the loss function (or objective function) of the learning machine to assign more weight to the new data-point (the one based on the deviated pattern) so that it may be absorbed more quickly into the model. In one or more instances, the deviated pattern may come with its own label which may be precisely the time-to-collision event data that was captured from the observation performed on real life deployment of the model. Here is where the actual adaption of the risk model happens because the label of the deviated pattern is precisely the necessary modification that the risk model needs to adapt to a real-life situation detected on-deployment (on-line) such as adapting to the specific driver's skill. An additional consideration is the fact that there may be data points (inputs) for deviated patterns that may be found upon real life deployment which might not exist on the original corpus of data, (thus these points won't be similar to any data-point in the corpus) and for these cases the adaptable on-deployment learning platform 202 may have the labels. Even when no similarity is found in the corpus, the adaptable on-deployment learning platform 202 may incorporate these new data points on the re-training of the model with the retraining procedure described above.

Additionally, or alternatively, the adaptable on-deployment learning platform 202 may incorporate the deviated pattern by adding, to the original risk model, another learning machine that may be separate and which may be trained only on new data-points. In these instances, an additional module, referred to herein as the evaluation module, may be included that now may evaluate the inputs before they are fed into the original risk model. The purpose of the evaluation may be to determine if the inputs are similar enough to the new data-points that have been obtained from the resulting deviated patterns found on deployment. If the inputs are similar to the new data-points then the input may be fed to the learning machine that was trained on new data points and its output is taken as the final risk estimation, otherwise the inputs may be fed to the original risk model and its output may be taken as a final risk estimation.

In an instance where the same initial driving scenario generates two contradicting outcomes as detected by the consistency analysis module described above, the adaptable on-deployment learning platform 203 may proceed to perform the modification of the risk model in a different way. In this instance, the adaptable on-deployment learning platform 202 may use the first part of the driving sequence corresponding to the deviated patterns associated with the opposed outcomes to train a learning machine (this learning machine that resolves the contradictions is trained to recognize the inputs that present contradictions and the first part of the sequence associated with every contradicting pattern the labels are the corresponding low-TTC event prediction for each contradicting pattern). This may allow the adaptable on-deployment learning platform 202 to be able to recognize, by observing the first part of the sequence of driving actions (the first seconds) following the initial scenario, if there is a situation that corresponds to contradicting outcomes on the original risk model. The contradicting outcomes are fully described and explained by different sequences of driving actions precisely because it is a result of the different sequences that the different outcomes have been generated (the driver actions may be responsible for the low TTC events). Therefore, the evaluation module mentioned above may incorporate a new task (this task is delivered by the learning machine, mentioned above, that resolves the contradictions) that now may evaluate the first part of the sequence of actions in addition to the evaluation of the inputs. If, as a result of evaluating the inputs and the first part of the sequence of actions, the adaptable on-deployment learning platform 202 determines that the user is following one of the driving patterns where a contradiction exists, the adaptable on-deployment learning platform 202 may deliver, as a final risk estimation, the outcome that corresponds to the real-life outcome that was recorded and that is associated with the corresponding deviated pattern that matches the first part of the sequence.

In one or more instances, a contradiction exists and a cluster may have been generated with two or more driving patterns. The fact that two or more driving patterns have been discovered by the consistency analysis may happen because there could be more than one influencing factor in the cluster beyond what is accounted for in the input to the original risk model (these are what we referred to as unseen factors above). Thus given that all the inputs are similar within the cluster the question is how it could be possible to distinguish when different unseen factors are in play. The procedure mentioned above for handling the contradiction holds in these instances because the evaluation module above may provide matching against the first part of the sequence of driver actions and thus it may correctly match the corresponding driving pattern. Therefore, the evaluation module determines based on the first part of the sequences of actions which specific driving pattern is in play (and by implication it determines that a given unseen factor is in play). The procedure described in this paragraph may also be applicable even if the different driving pattern within the cluster is generated due to two or more factors simultaneously being in play (for example part of the cluster correspond to one unseen factor and the other part corresponds to this same unseen factor plus another unseen factor playing simultaneously). Any combination of unseen factors may be addressed by the procedure described in this paragraph.

As indicated, the adaptable on-deployment learning platform 202 may be adding additional input information to the inputs involved in the original risk model precisely to compensate for the fact that the original model may be blind to some important influencing factors. An additional critical remark may be the fact that adaptable on-deployment learning platform 202 might not at this point be identifying the specific influencing factor to which the original risk model is blind. Regardless of what that factor is, the adaptable on-deployment learning platform 202 may be able to identify the situations when such factor (or factors) occur and the adaptable on-deployment learning platform 202 may be able to provide the necessary adaptation to the risk model in order to incorporate the accurate estimation modification. The ability to identify these situations may be powered by the use of the sequence of driving actions as a language that the adaptable on-deployment learning platform 202 may exploit.

Figure 3D:
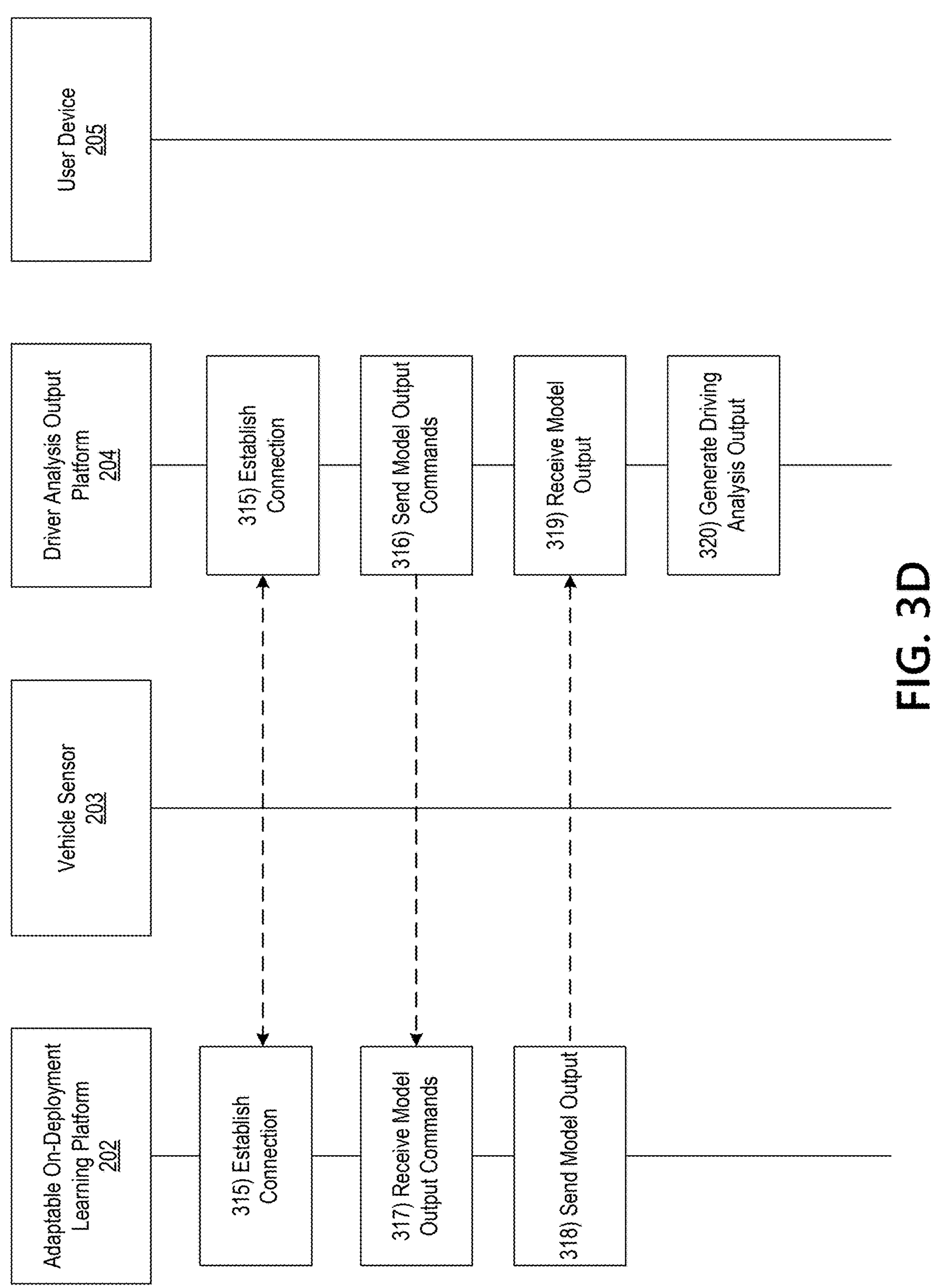

Referring to FIG. 3D, at step 315, the driver analysis output platform 204 may establish a connection with the adaptable on-deployment learning platform 202. In one or more instances, the driver analysis output platform 204 may establish a second wireless data connection with the adaptable on-deployment learning platform 202 to link the driver analysis output platform 204 to the adaptable on-deployment learning platform 202.

At step 316, the driver analysis output platform 204 may generate one or more commands directing the adaptable on-deployment learning platform 202 to provide an output corresponding to the machine learning analysis performed on the sensor data. In one or more instances, the driver analysis output platform 204 may send the one or more commands directing the adaptable on-deployment learning platform 202 to provide an output corresponding to the machine learning analysis performed on the sensor data while the second wireless data connection is established.

At step 317, the adaptable on-deployment learning platform 202 may receive the one or more commands directing the adaptable on-deployment learning platform 202 to provide an output corresponding to the machine learning analysis performed on the sensor data from the driver analysis output platform 204. In one or more instances, the adaptable on-deployment learning platform 202 may receive the one or more commands directing the adaptable on-deployment learning platform 202 to provide an output corresponding to the machine learning analysis performed on the sensor data via the communication interface 213 while the second wireless data connection is established.

At step 318, the adaptable on-deployment learning platform 202 may generate the output corresponding to the machine learning analysis performed on the sensor data, and may send it to the driver analysis output platform 204. In one or more instances, the adaptable on-deployment learning platform 202 may send the output corresponding to the machine learning analysis performed on the sensor data via the communication interface 213 and while the second wireless data connection is established.

At step 319, the driver analysis output platform 204 may receive the output corresponding to the machine learning analysis performed on the sensor data. In one or more instances, the driver analysis output platform 204 may receive the output corresponding to the machine learning analysis performed on the sensor data while the second wireless data connection is established.

At step 320, the driver analysis output platform 204 may generate a driving analysis output. As described above, the adaptation of the risk model may be carried-on by the methods described herein without, in at least some examples, using explicit modeling of the other influencing factors that may be ignored by the original risk model. One of these other influencing factors may include driver skill and this factor may be a differentiator on the driving performance as well as on the ability to keep reasonably safe at all times, which may have an impact on risk prediction. Since the methods described herein customize models for the specific characteristics of the driver, it is natural to extend the idea to provide an on-line characterization of the driver skill. In these instances, the purpose might not be to customize a risk model but may be to provide a characterization and a grading of the driver skill so that this information may be provided to the user-driver as feedback on his or her driving ability. Accordingly, the driver analysis output platform 204 may generate the driving analysis output to provide such feedback.

A characterization of driving skill may be addressed according to two major driving tasks that may be very common on any driving scenario: path tracking and lane change. There are a number of metrics that may be extracted from the actual video feed that records the driving of a given user such as lateral position with respect to road reference, lateral acceleration, stability of steering wheel angle, headway size employed during following, time delay for following the speed of lead vehicle, or the like. In one or more instances, this information may be received by the driver analysis output platform 204 at step 319.

For the first metric, the skill may be graded in terms of deviating the least from the preferred track. For the second metric, the lateral acceleration may be expected to be minimal. The stability of the steering wheel may be measured by the first and second derivatives of the wheel angle, which may provide a measure of the smoothness of the driving and for a highly skilled driver these derivatives may be expected to be low. The headway size may be expected to be around the recommendations provided by driving regulations (between four and six meters). The last metric may be related to the attentiveness and ability to focus on the driving task and for a highly skilled driver this delay may be expected to be less than one second.

The metrics mentioned above may be measured over a period of time that covers a variety of driving scenarios and the driver analysis output platform 204 may generate a combined score that grades the driver skill from one to ten. The consistency of this characterization may be delivered by first recognizing the driving scenarios and identifying them so that the metrics may be averaged over the same scenarios. For this purpose, the different scenarios may be clustered through unsupervised learning in the same manner as described above (e.g., by maximizing the inter-cluster variance and minimizing the intra-cluster variance). In these instances, however, all the scenarios involved in the driving may be considered (not only the scenarios related to deviations from a risk model). Once the driving scenarios are identified, the metrics may be computed and averaged and thus scores for driving skills per scenario may be generated and provided to the user for feedback and informative purposes via the driving analysis output.

Figure 3E:
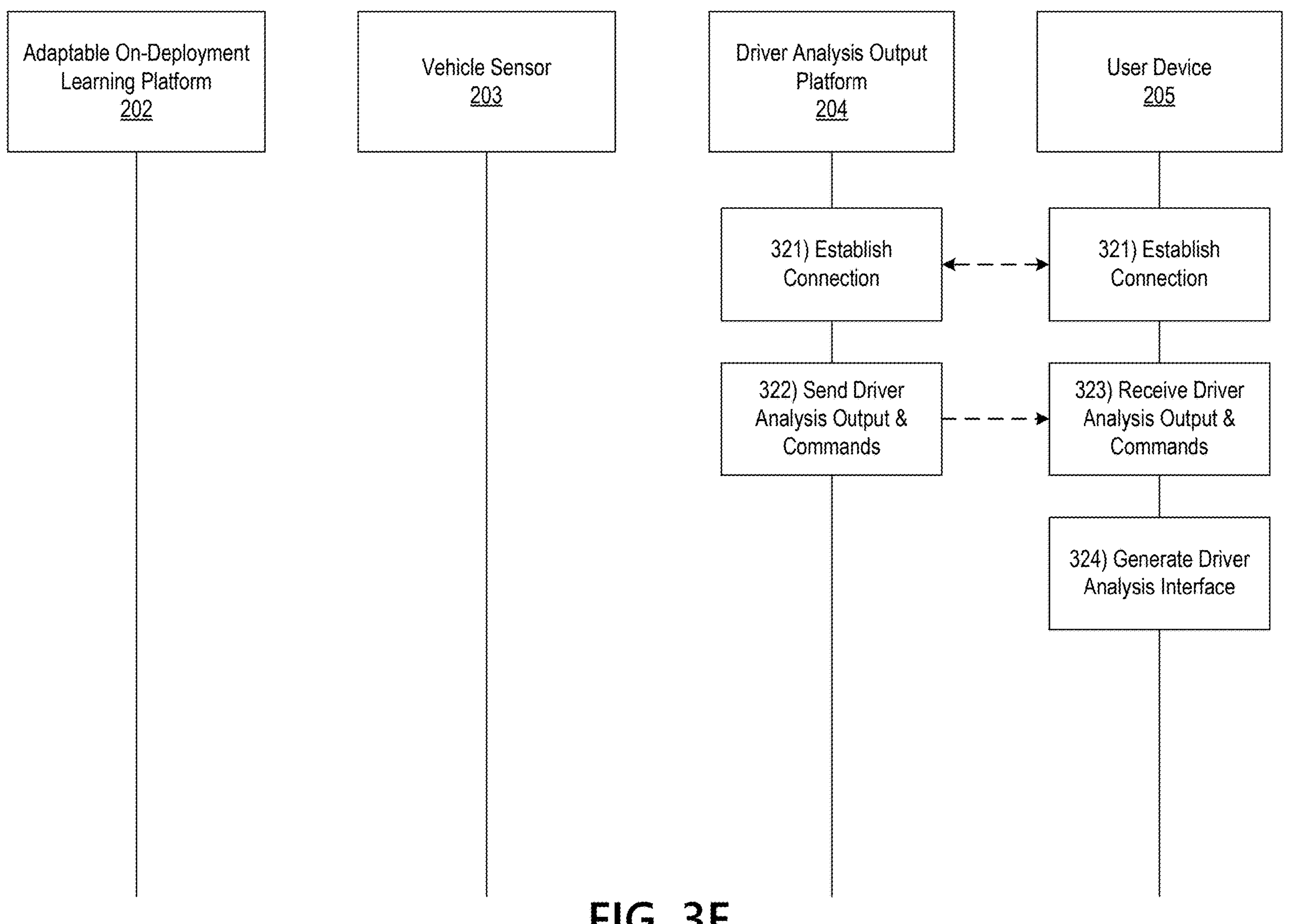

The driving skill score mentioned above can be used to train on-line (on deployment) an alternate predictive risk model that will incorporate in addition to the inputs from the driving scenario mentioned previously another input which will provide an indicator of the skill level of the driver (from 1 to 10). This can be considered as a new feature. Therefore, having the usual predictive risk model/system that works with the inputs of the driving scenario, the alternate risk model/system will use these same inputs in addition to the driver skill level obtained from the driver skill score captured. The labels for the alternate predictive risk system will be the same labels that are used by the adaptable risk model system (in other words the labels will be those that are modified after adaptation so that the alternate predictive risk model is trained with the latest and greatest up-to-date information). The driving skill score used as input for the alternate risk prediction system will be just the initial condition setting. Under an overall architecture that involves interconnection between predictive risk systems from different vehicles, the different inputs for all the scenarios and the different consistency driving patterns are reported to a centralized location for analysis. In this location a population of data on driving scenarios and sequences of driving actions is collected. On the centralized location it is possible to synthesize into one universal risk predictive model all the different driving scenarios belonging to a population of user drivers. Here the driving skill score information from different users can be used to train the universal risk predictive model and thus obtain a risk model that accounts for the driving skill of the users. Once the universal model is trained an optimization module can gradually change the different values on the individual driving skills of all the drivers to better fit all the collected data from all the drivers. Therefore, we can obtain a modified driving skill feature value that is obtained by means of comparison with other drivers. This driving skill value can be reported back from the centralized location to individual driver user (by means of telematics) so that this value can be used on the alternate predictive risk model/system that is used by the driver. The driving skill input is expected to provide a reference input to a risk model based on machine learning that can assist to provide a better model and a more successful prediction (providing a similar functionality as the bias provides in a neural network since the bias is a static value that never changes once the neural network is trained). The driving skill value can be updated by means of updates from the centralized location (which will continuously synthesize universal models using data that is continuously provided by more drivers and more driving scenarios) or updates from the driving skill scoring method described above which runs continuously during the lifetime the user uses the risk prediction system. The risk prediction system will also have the capability to discriminate different drivers either by means of having the driver identify itself through some manual setting, or by means of identifying driving signatures by analyzing specific driving patterns that consistently separate two driving profiles (for this purpose the consistency analysis can deliver this functionality) and thus suggesting separate profiles once the driving signatures are identified so that the drives can confirm the driving signatures through a setting (this in case a vehicle is driven by more than one driver). Referring to FIG. 3E, at step 321, the driver analysis output platform 204 may establish a connection with the user device 205. In one or more instances, the driver analysis output platform 204 may establish a third wireless data connection with the user device 205 to link the driver analysis output platform 204 to the user device 205.

At step 322, the driver analysis output platform 204 may generate one or more commands directing the user device 205 to generate a driver analysis interface based the driver analysis output. In one or more instances, the driver analysis output platform 204 may send the one or more commands directing the user device 205 to generate the driver analysis interface based on the driver analysis output along with the driver analysis output. In one or more instances, the driver analysis output platform 204 may send the one or more commands directing the user device 205 to generate the driver analysis interface based on the driver analysis output and the driver analysis output while the third wireless data connection is established.

At step 323, the user device 205 may receive the driver analysis output and the one or more commands directing the user device 205 to generate a driver analysis interface based the driver analysis output. In one or more instances, user device 205 may receive the driver analysis output and the one or more commands directing the user device 205 to generate a driver analysis interface based the driver analysis output while the third wireless data connection is established.

Figure 5:
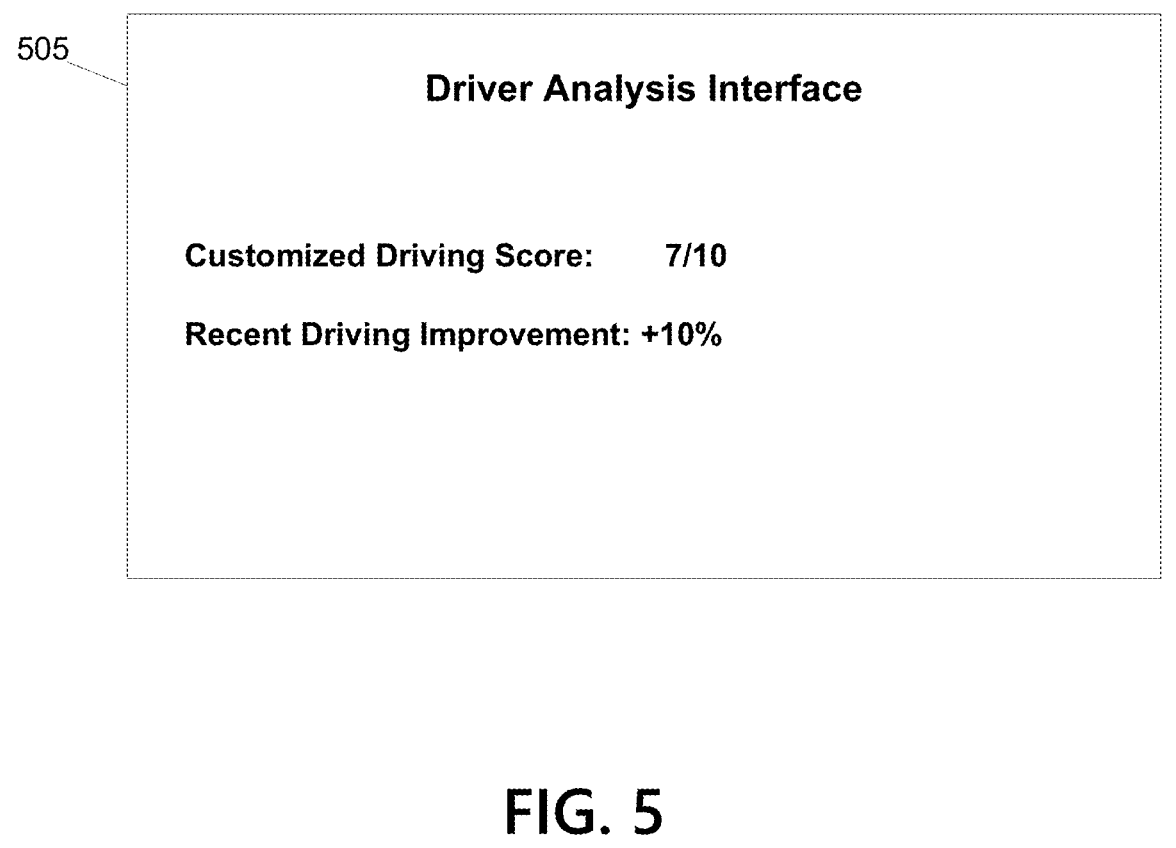

At step 324, the user device 205 may generate and display a driver analysis interface based on the driver analysis output. In one or more instances, in displaying the driver analysis interface, the user device may display a graphical user interface similar to graphical user interface 505, which is shown in FIG. 5. In one or more instances, the graphical user interface 505 may include a driving score tailored to the user of the user device 205. Additionally or alternatively, the graphical user interface 505 may include a driving improvement metric that reflects a change in the driving score over a predetermined period of time.

The following further considerations may be considered with regard to steps 301-324 as described above. As described above, given an initial driving scenario there may be a sequence of driver actions over the time period that corresponds to the horizon of prediction (which may be around 15-20 seconds or longer). There may be similarly an evolution of the driving scenario over this period of time and there may be a sequence of scenarios that may correspond to the sequence of driver actions that occur over the prediction horizon. The sequence of scenarios may also be captured, recorded and analyzed. The procedures to analyze consistency of deviated patterns, that was described above with regard to steps 301-324, through the application of LSTMs or dynamic Bayesian networks may also be applied to the sequence of driving scenarios to verify pattern alignment and thus verify repeatability (so that anomalies and artifacts may be excluded from consideration). Once a given sequence of driving scenarios has been identified as consistent, then the adaptable on-deployment learning platform 202 may use this sequence to explain why some deviated patterns obtained through the procedures described above might not align with the rest of the deviated patterns in the cluster. In these instances, it may be possible for some sequence of scenarios that has some repeatability may influence the actions of the user and therefore the deviated pattern might not align with other cases where the influence of such sequence of scenarios might not be present. This may be used to refine the adaptation procedure described above by introducing the sequence of scenarios as one additional component of information to be processed by the evaluation module described above. In this case, the sequence of scenarios may have induced a new deviated pattern and thus the adaptable on-deployment learning platform 202 may recognize this pattern by using the first part of the sequence of scenarios to identify the deviated pattern. In this case, the evaluation module described above may evaluate the first part of the sequence of actions in addition to the first part of the sequence of scenarios. Since consistency may have been previously verified for both sequences, it may be possible to detect the driving pattern that has been induced by both sequences. This may provide a more comprehensive method to address adaptability. The idea behind including the sequence of scenarios is the fact that the driving characteristics of the surrounding drivers may have an effect on the user-driver and thus the adaptable on-deployment learning platform 202 may be in the position to capture this effect as well. Nevertheless, the highest effect on driving may correspond to the actual actions that the user-driver performs.

Another consideration may be the incorporation of other inputs that may better identify the driving scenario and may provide an additional reference for the identification of driving patterns. In one or more instances, the other inputs may include some contextual factors such weather, environmental driving scene (rural, suburban, urban, highway, beach, or the like), traffic conditions (rush hour, or the like), and others. These additional inputs may be used as additional components to identify deviated patterns, which may set a reference context and may also be used to identify these patterns by incorporating this information to the evaluation module in a similar manner as the sequence of scenarios was incorporated as described in the paragraph above. The contextual information may add an additional dimension that may provide a better reference for pattern identification to assist in risk model adaptation/modification.

The procedures described herein may also be applicable to a specific group of risk models that may be based on the application of imitation learning to predict driver actions. In this case, the pattern deviation procedures described above may be applied to state-action pairs. In this case, the state may become the input and the action may become the output. Similarly, as described with regard to the procedures for detection of deviated patterns and consistency analysis above, the adaptable on-deployment learning platform 202 may detect pattern deviations from state action pairs and may verify the validity of the deviations by analyzing the sequence of actions that follows an initial state-action pair. The consistency validation may allow performing of an appropriate correction to these state-action pairs that may deviate in real-life from the original risk model. Similar procedures for incremental learning described above may be applied in this case and may allow the incorporation of deviated state-action pairs and unseen state-action pairs into the model that was based on imitation learning. One important remark in this case is the fact that imitation learning may usually be performed by using data obtained from an expert driver in order to derive the policy that predicts the actions for the given states. Since real-life deployment may impose the fact that the user of the risk model might not be an expert driver (e.g., a 16 year old driver), then significant deviation from the original model may exist. The methods described herein may allow the adaptable on-deployment learning platform 202 to adapt and customize the original model to the characteristic of the user.

Figure 4:
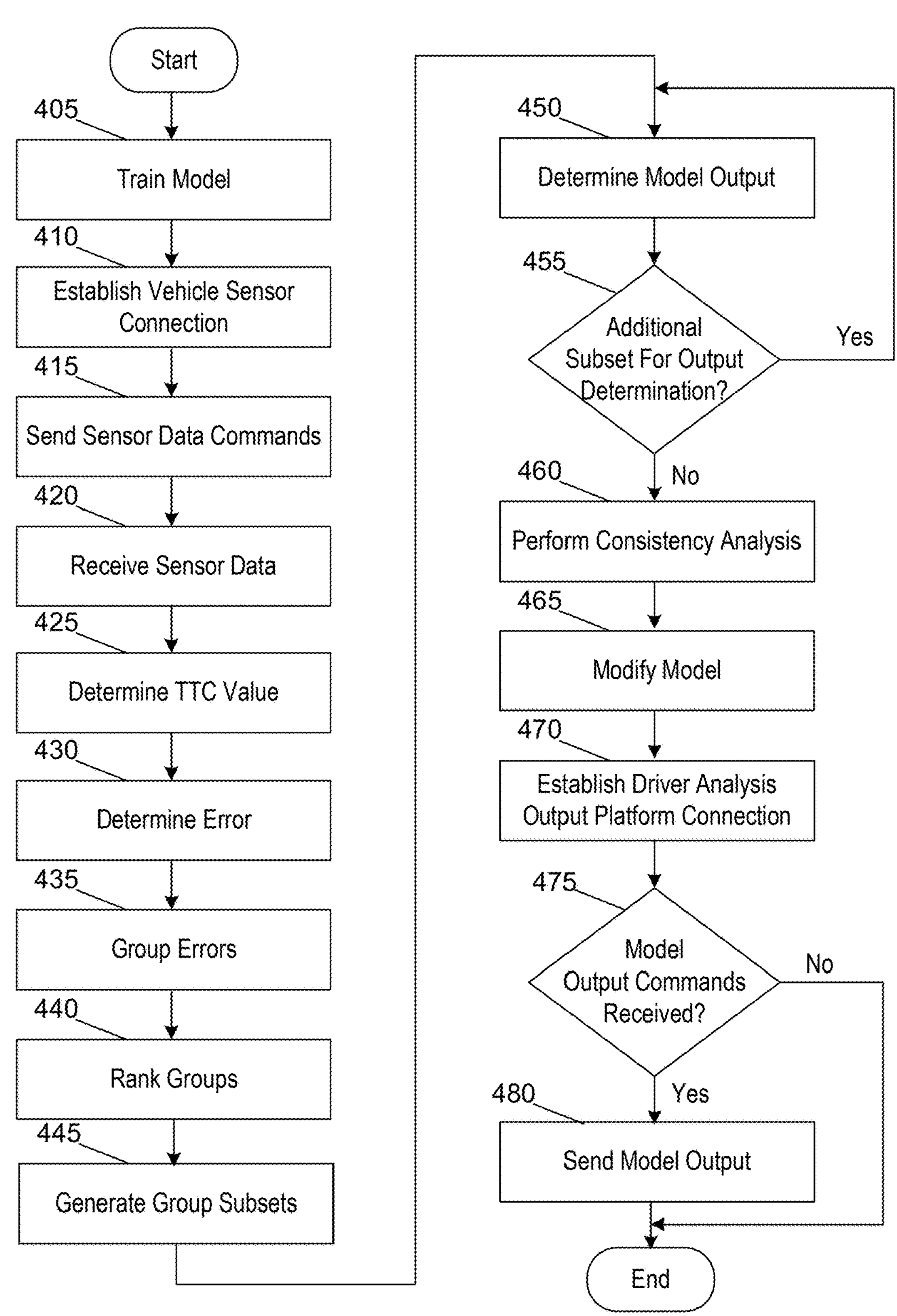
FIG. 4 depicts an illustrative method for deploying an adaptable on-deployment learning platform that utilizes improved machine learning methods and that is permanently learning in accordance with one or more example arrangements discussed herein.

FIG. 4 depicts an illustrative method for deploying an adaptable on-deployment learning platform that utilizes improved machine learning methods to perform driver evaluation in accordance with one or more example embodiments. Referring to FIG. 4, at step 405, the adaptable on-deployment learning platform may train one or more initial models. At step 410, the adaptable on-deployment learning platform may establish a wireless data connection with one or more vehicle sensors. At step 415, the adaptable on-deployment learning platform may send one or more commands directing the sensors to collect sensor data and send the sensor data to the adaptable on-deployment learning platform. At step 420, the adaptable on-deployment learning platform may receive the sensor data. At step 425, the adaptable on-deployment learning platform may determine TTC values corresponding to the sensor data. At step 430, the adaptable on-deployment learning platform may determine error corresponding to the TTC values. At step 435, the adaptable on-deployment learning platform may group the determined errors. At step 440, the adaptable on-deployment learning platform may rank the determined groups. At step 445, the adaptable on-deployment learning platform may generate group subsets corresponding to the ranked groups. At step 450, the adaptable on-deployment learning platform may determine a model output for a subset of the ranked groups. At step 455, the adaptable on-deployment learning platform may determine whether model outputs have been determined for each subset of the ranked groups. If model outputs have not been determined for each subset of the ranked groups, the adaptable on-deployment learning platform may return to step 450. If model outputs have been determined for each subset of the ranked groups, the adaptable on-deployment machine platform may proceed to step 460.

At step 460, the adaptable on-deployment learning platform may perform a consistency analysis based on the model outputs. At step 465, the adaptable on-deployment learning platform may modify the initial models based on the consistency analysis. At step 470, the adaptable on-deployment learning platform may establish a connection with a driver analysis output platform. At step 475, the adaptable on-deployment learning platform may determine whether one or more commands directing the adaptable on-deployment learning platform to send a model output were received. If one or more commands directing the adaptable on-deployment learning platform to send the model output were not received, the method may end. If one or more commands directing the adaptable on-deployment learning platform to send the model output were received, the adaptable on-deployment learning platform may proceed to step 480. At step 480, the adaptable on-deployment learning platform may generate a model output based on the modified model, and may send the model output to the driver analysis output platform.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform, comprising:
at least one processor;
a communication interface; and
memory storing computer-readable instructions that, when executed by the at least one processor, cause the computing platform to:
train a risk model with a first dataset containing a plurality of data points; and
deploy the risk model by:
receiving, from one or more vehicle sensors, sensor data inputs;
generating, for one or more of the sensor data inputs, a pattern deviation output corresponding to an output of the risk model and an assessment of risk associated with a given driver experience;
clustering the pattern deviation outputs to maximize a ratio of inter-cluster variance to intra-cluster variance;
training a long short term memory (LSTM) for each cluster;
performing a consistency analysis to verify, based on the LSTM for each cluster, consistency of the pattern deviation outputs in each cluster;
modifying, when the consistency of the pattern deviation outputs in each cluster is verified, the risk model to reflect pattern deviation outputs associated with verified consistency; and
identifying, when the consistency of the pattern deviation outputs in each cluster is not verified, sensor data inputs associated with deviated patterns that do not correspond to the plurality of data points of the first dataset as a second dataset containing a plurality of new data points.

2. The computing platform of claim 1, wherein the memory stores additional computer-readable instructions that, when executed by the at least one processor, cause the computing platform to set permanent adaptation by continuously deploying the risk model.

3. The computing platform of claim 1, wherein the memory stores additional computer-readable instructions that, when executed by the at least one processor, cause the computing platform to:
retrain the modified risk model with the first dataset containing the plurality of data points.

4. The computing platform of claim 3, wherein retraining the modified risk model includes locating a data point of the first dataset that is most similar to the deviated pattern by comparing the data point to the deviated pattern based on the Euclidian distance and replacing the data point with the input associated with the deviated pattern.

5. The computing platform of claim 3, wherein retraining the modified risk model includes retraining the modified risk model with the first dataset containing the plurality of data points and a second dataset containing the plurality of new data points.

6. The computing platform of claim 1, wherein the memory stores additional computer-readable instructions that, when executed by the at least one processor, cause the computing platform to:

train a further risk model with the second dataset containing the plurality of new data points.

7. The computing platform of claim 6, wherein the memory stores additional computer-readable instructions that, when executed by the at least one processor, cause the computing platform to:

determine a similarity for one or more of the sensor data inputs to the new data points, and input the similar one or more of the sensor data inputs to the further risk model to generate, as an output, the assessment of risk associated with a given driver experience.

8. A computer-implemented method comprising:

training a risk model with a first dataset containing a plurality of data points; and deploying the risk model by:

receiving, from one or more vehicle sensors, sensor data inputs;

generating, for one or more of the sensor data inputs, a pattern deviation output corresponding to an output of the risk model and an assessment of risk associated with a given driver experience;

clustering the pattern deviation outputs to maximize a ratio of inter-cluster variance to intra-cluster variance;

training a long short term memory (LSTM) for each cluster;

performing a consistency analysis to verify, based on the LSTM for each cluster, consistency of the pattern deviation outputs in each cluster;

modifying, when the consistency of the pattern deviation outputs in each cluster is verified, the risk model to reflect pattern deviation outputs associated with verified consistency; and identifying, when the consistency of the pattern deviation outputs in each cluster is not verified, sensor data inputs associated with deviated patterns that do not correspond to the plurality of data points of the first dataset as a second dataset containing a plurality of new data points.

9. The computer-implemented method of claim 8, further comprising setting permanent adaptation by continuously deploying the risk model.

10. The computer-implemented method of claim 8, further comprising retraining the modified risk model with the first dataset containing the plurality of data points.

11. The computer-implemented method of claim 10, wherein retraining the modified risk model includes locating a data point of the first dataset that is most similar to the deviated pattern by comparing the data point to the deviated pattern based on the Euclidian distance and replacing the data point with the input associated with the deviated pattern.

12. The computer-implemented method of claim 10, wherein retraining the modified risk model further includes retraining the modified risk model with the first dataset containing the plurality of data points and a second dataset containing the plurality of new data points.

13. The computer-implemented method of claim 12, further comprising training a further risk model with the second dataset containing the plurality of new data points.

14. The computer-implemented method of claim 13, further comprising:

determining a similarity for one or more of the sensor data inputs to the new data points, and inputting the similar one or more of the sensor data inputs to the further risk model to generate, as an output, the assessment of risk associated with a given driver experience.

15. One or more non-transitory computer-readable media storing instructions that, when executed by a computing platform comprising at least one processor, a communication interface, and memory, cause the computing platform to:

train a risk model with a first dataset containing a plurality of data points; and deploy the risk model by:

receiving, from one or more vehicle sensors, sensor data inputs;

generating, for one or more of the sensor data inputs, a pattern deviation output corresponding to an output of the risk model and an assessment of risk associated with a given driver experience;

clustering the pattern deviation outputs to maximize a ratio of inter-cluster variance to intra-cluster variance;

training a long short term memory (LSTM) for each cluster;

performing a consistency analysis to verify, based on the LSTM for each cluster, consistency of the pattern deviation outputs in each cluster;

modifying, when the consistency of the pattern deviation outputs in each cluster is verified, the risk model to reflect pattern deviation outputs associated with verified consistency; and identifying, when the consistency of the pattern deviation outputs in each cluster is not verified, sensor data inputs associated with deviated patterns that do not correspond to the plurality of data points of the first dataset as a second dataset containing a plurality of new data points.

16. The one or more non-transitory computer-readable media of claim 15, wherein the instructions that, when executed by the at least one processor, further cause the computing platform to:

set permanent adaptation by continuously deploying the risk model.

17. The one or more non-transitory computer-readable media of claim 15, wherein the instructions that, when executed by the at least one processor, further cause the computing platform to:

retrain the modified risk model with the first dataset containing the plurality of data points.

18. The one or more non-transitory computer-readable media of claim 17, wherein the retraining the modified risk model includes locating a data point of the first dataset that is most similar to the deviated pattern by comparing the data point to the deviated pattern based on the Euclidian distance and replacing the data point with the input associated with the deviated pattern.

19. The one or more non-transitory computer-readable media of claim 17, wherein retraining the modified risk model further includes retraining the modified risk model with the first dataset containing the plurality of data points and a second dataset containing the plurality of new data points.

20. The one or more non-transitory computer-readable media of claim 19, wherein the instructions that, when executed by the at least one processor, further cause the computing platform to:

train a further risk model with the second dataset containing the plurality of new data points.

* * * * *